United States Patent Office 3,284,523
Patented Nov. 8, 1966

1

3,284,523
METHOD FOR MAKING 5-t-BUTYL-m-XYLENE

Thomas A. Beck, Park Forest, and Owen H. Thomas, South Holland, Ill., assignors to Sinclair Research, Inc., a corporation of Delaware No Drawing. Filed July 8, 1963, Ser. No. 293,261
8 Claims. (Cl. 260—668)

This invention is a method for the production of 5-tertiary butyl meta-xylene,

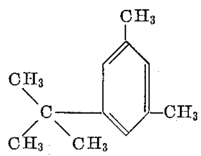

In the method of this invention, a feedstock is contacted with sulfuric acid under carefully controlled conditions to convert other t-butyl meta-xylene isomers, e.g. 4-t-butyl meta-xylene, to the desired product and/or to bring about alkylation of meta-xylene with isobutylene when present in alkylation proportions. In either circumstance, the amount of 5-tertiary butyl-metha-xylene in the product can be maximized, for instance, at approximately 94 to 96% of the total tertiary butyl meta-xylenes present. Substantially pure 5-tertiary-butyl-m-xylene is of use as an intermediate in the synthesis of 5-t-butyl isophthalic acid, a polyester resin feedstock, for instance one specification on 5-t-butyl m-xylene requires 98% minimum purity with 1% or less of t-butylethyl benzene.

The process of this invention marks a radical departure from conventional alkylation or isomerization processes, even those which are acid catalyzed, in that the process of this invention takes place in the acid phase, that is, with the sulfuric acid as the major or continuous component of the reaction mixture. In this invention, there may be a near quantitative yield of 5-t-butyl-m-xylene based on the m-xylene or substituted m-xylene feed with a near exclusion of the 4-position isomer from the product. Also, there is no substantial conversion, in this process, of p-t-butylethyl benzene to m-t-butylethyl benzene which is difficult to separate from the desired 5-position product.

The process of this invention preferably employs a continuous system with constant addition of hydrocarbon and recycle of acid to the reaction zone. Reaction conditions which are especially controlled are temperature, sulfuric acid concentration, the volume ratio of hydrocarbon to acid in the reactor and usually the VHSV, that is, volume of total hydrocarbon (aromatic and olefin) charged per hour per volume of acid in the reactor. The reaction is performed at a temperature of about −10 to 30° C., preferably about −5 to 25° C., with up to about 1.1 volume of hydrocarbon, generally at least about 0.1 and preferably about 0.5 to 0.9 volume of hydrocarbon, per volume of sulfuric acid. The volume hourly space velocity may often be in the range of about 2 to 10 or more, preferably about 4 to 8.

Acid strength is carefully controlled in the range of about 88 to 92 weight percent, the essential balance being water. Operation with lower acid strengths (<88%) gives both lower alkylation selectivities and greater amounts of 4-tertiary butyl meta-xylene in the product. More concentrated acid (>92%) gives rise to excessive sulfonation of meta-xylene component thereby resulting in a rapid decline in acidity.

The feedstock to the alkylation reaction preferably is a xylene or $C_8$ aromatic concentrate containing essentially meta-xylene with only small amounts of ortho-xylene and ethylbenzene. Para-xylene is not consumed in the alkylation reaction since it is comparatively unreactive in this system. The preferred feed for alkylation is one contain-

2 ing at least about 75% meta-xylene. Such a feedstock may also have about 0.2 to 10% of each of ortho-xylene and ethylbenzene with the remainder being para-xylene. One feedstock contains about 6% total of o-xylene and ethylbenzene. The feedstock may also include 4-t-butyl-meta-xylene in any proportion; for instance in alkylation the amount of the 4-position isomer may be up to and including 80% or more of the feedstock, and, when there are large amounts of this isomer there may be little or no meta-xylene in the feed especially when used for isomerization only, but the presence of excess meta-xylene in the feedstock appears to have little effect on the reaction, whether it be alkylation, isomerization or both. The isobutylene may be fed to the reaction simultaneously with, or subsequent to, the mixing of the acid and xylene component. The isobutylene can be used in a molar amount, sufficient to convert the desired amount of meta-xylene and, when total conversion of the xylene component is desired, it is usually advisable to use a slight excess of the olefin.

A preferred apparatus for conducting the alkylation reaction consists of an impeller-driven contactor, as normally used for liquid phase alkylation, a settler for separation of the hydrocarbon-acid emulsion, a collection system for hydrocarbon product which overflows from the settler, and appropriate pumps for feeding the hydrocarbon and for recycling acid from the settler to the contactor.

The invention will be better understood by reference to the following examples which are illustrative only and should not be considered limiting.

*Examples*

In run 81 a Stratco contactor equipped as described above was used for the alkylation. 2030 cc. of 90.8% sulfuric acid was charged to the system together with 530 cc. of a m-xylene concentrate which contained 80.0% meta-xylene, 3.3% ethylbenzene, 2.8% ortho-xylene and 13.9% para-xylene. The system was brought to temperature (20° C.) by external cooling and isobutylene addition was begun. The volume ratio of total hydrocarbon to sulfuric acid in the contactor was maintained at 0.7 by control of the acid recycle rate. The mole ratio of aromatic feed to isobutylene was 2.41. The rate of total hydrocarbon fed to the system gave a volume hourly space velocity of 3.67. Continuous addition of hydrocarbon feed with continuous recycle of acid was continued for 50 minutes and after 55 minutes additional stirring, overflow hydrocarbon product was collected from the settler. Samples were collected throughout this time period and analyzed by gas chromatography. Treatment of the product by successive washings with water, 5% NaOH and water followed by drying over Drierite gave a colorless liquid containing 0.010% sulfur and having the following content of hydrocarbons: meta- and para-xylenes 45.0%; 5-t-butyl-meta-xylene 41.0%; meta- and para-t-butylethyl benzene 4.2%; 4-t-butyl-o-xylene 3.6%; 4-t-butyl-m-xylene 2.6%; triisobutylene 1.1%; $C_{16}$ 1.0%; others, 1.8%. Distillation of the product on a 4′ x 30 mm. Podbielniak column gave a pure sample of 5-tertiary-butyl-meta-xylene with minor amounts of meta- and para-tertiary butylethyl benzene and 4-tertiary butyl ortho-xylene. No 4-tertiary butyl meta-xylene was present in the purified product. For comparison the boiling points of the tertiary butylated aromatics are as follows:

| Product: | B.P. ° F./760 mm. |
|---|---|
| 5-t-butyl-m-xylene | 403 |
| m-t-Butyl ethyl benzene | 404 |
| p-t-Butyl ethyl benezen | 413 |
| 4-t-butyl-o-xylene | 417 |
| 2-t-butyl-p-xylene | 420 |
| 4-t-butyl-m-xylene | 427 |

A number of other runs were conducted to show the effect of process variables on selectivity and product distribution. The feedstocks to these examples were approximately as follows:

| Run | 60 | 63-64 | 84-85 |
|---|---|---|---|
| Ethylbenzene | 3.5 | 3.9 | 3.3 |
| Meta-xylene | 81.6 | 79.5 | 80.0 |
| Para-xylene | 12.2 | 13.7 | 13.9 |
| Ortho-xylene | 2.7 | 2.9 | 2.8 |

The results of these runs are reported in Table I.

From the data in Table I it can be seen that there is a large difference in selectivity to 5-tertiary butyl meta-xylene between runs made in the acid phase (HC/acid= 0.7) and runs made in the hydrocarbon phase (HC/acid= 1.5–4.0). For example, in runs 60 and 81 where (HC/acid) is the variable, there is a considerable difference in alkylation selectivity and also a significant difference in the tertiary butyl meta-xylene isomer distribution. It can also be seen from Table I that those runs made in the hydracarbon phase give pronounced differences in alkylation selectivity with changes in temperature and space velocity whereas the acid continuous phase runs are not as affected by these variables.

When the feedstock is, or contains 4-t-butyl-m-xylene, the same process conditions give excellent yields of the 5-position isomer, with or without the presence of additional meta-xylene. In a series of runs a feedstock consisting primarily of t-butyl-xylene isomers was fed to a reaction such as described above without the addition of isobutylene to the system. The composition of this feedstock is given in Table II, below, as sample 7. In run 99 this unblended sample was used; in run 100 the feedstock consisted of a blend of sample 7 with about 2.25 moles per mole of sample 7 of a feedstock comprising about 96.8% meta-xylene, 1.7% ortho-xylene, 0.8% para-xylene and 0.6% ethylbenzene. In run 2, about 2.63 moles of the meta-xylene-rich feedstock was used per mole of sample 7. The conditions and results of these runs are given in Table II, in which the analysis of feed or products is the gas chromatography area percent.

TABLE II

| Run or Sample | 7 | 99 | 100 | 2 |
|---|---|---|---|---|
| Conditions: | | | | |
| Temperature (° C.) | ------ | 20 | 20 | 0 |
| Vol. HC/Vol. Acid | ------ | 0.7 | 0.7 | 0.7 |
| Moles xylene/moles t-bu-xyl | ------ | ------ | 2.4 | 2.8 |
| Length of run (min.) | ------ | 120 | 60 | 120 |
| Analysis of feed (Run 7) or product (Runs 99, 100 and 2): | | | | |
| Isobutylene | ------ | 0.1 | ------ | ------ |
| Diisobutylene | ------ | 0.4 | ------ | ------ |
| Ethylbenzene | ------ | ------ | 0.3 | 0.2 |
| m- and p-xylene | ------ | 0.5 | 51.1 | 63.8 |
| o-Xylene | ------ | <0.1 | 0.6 | 0.1 |
| 5-t-butyl-m-xylene | 42.6 | 62.0 | 30.2 | 21.7 |
| t-Butylethyl benzene | 3.7 | 3.4 | 2.0 | 1.7 |
| 4-t-butyl-o-xylene | 21.3 | 20.7 | 11.4 | 9.0 |
| 2-t-butyl-p-xylene | 1.3 | 8.0 | 0.1 | 0.2 |
| 4-t-butyl-m-xylene | 28.6 | 3.2 | 3.1 | 2.4 |
| Isobutylene tetramer | 2.1 | 0.4 | 0.9 | 0.9 |
| Unknown | 0.3 | 1.4 | 0.1 | 0.1 |
| Mole percent t-butylxylenes: | | | | |
| 5-t-butyl-m-xylene | 43.7 | 63.7 | 64.5 | 62.1 |
| p-t-Butyl-m-xylene | 3.8 | 3.5 | 4.3 | 4.9 |
| 4-t-butyl-o-xylene | 21.8 | 21.3 | 24.3 | 25.7 |
| 2-t-butyl-p-xylene | 1.3 | 8.2 | 0.2 | 0.6 |
| 4-t-butyl-m-xylene | 29.4 | 3.3 | 6.6 | 6.8 |
| Isomer distribution t-bu-m-xylenes: | | | | |
| mole % 5-t-butyl-m-xylene | 59.8 | 95.2 | 90.7 | 90.0 |
| mole % 4-t-butyl-m-xyelene | 40.2 | 4.8 | 9.3 | 10.0 |

It is clear from the data in Table II that this process may be used for isomerization of the 4-t-butyl-m-xylene isomer to 5-t-butyl-m-xylene isomer and also that any 4-t-butyl meta-xylene produced in the alkylation of this invention may be recycled to the alkylation to improve the yield of the desired product. If xylene is in the feed, the product can easily be fractionated to yield 4-tertiary butyl meta-xylene for recycle. If ortho-xylene is present, giving rise to 4-tertiary butyl ortho-xylene, this too can be recycled since, in the presence of excess meta-xylene, it can function as a transalkylating agent thereby giving more utilization of isobutylene.

It is claimed:

1. A method for the production of 5-t-butyl-m-xylene which consists essentially of contacting in a continuous sulfuric acid phase, having a concentration of about 88 to 92%, at a temperature of about −10 to 30° C., a hydrocarbon feedstock selected from the group consisting of 4-tertiarybutyl-meta-xylene and a mixture consisting essentially of meta-xylene and isobutylene, in a ratio of

TABLE I

| Run No. | 60 | 63 | 64 | 81 | 84 | | 85 | |
|---|---|---|---|---|---|---|---|---|
| Conditions: | | | | | | | | |
| Temperature, ° C. | 18 | 0 | 0 | 20 | 6 | | 18 | |
| Vol-Ratio, HC/Acid | 4.0 | 4.0 | 1.5 | 0.7 | 0.7 | | 0.7 | |
| VHSV | 4.0 | 9.8 | 3.85 | 3.67 | 3.71 | 3.89 | 8.78 | 8.73 |
| Mole Ratio Xyl/$iC_4$= | 2.24 | 2.21 | 2.39 | 2.41 | 2.70 | 2.29 | 2.67 | 2.17 |
| $H_2SO_4$, Wt. percent | 88.1 | 88.1 | 88.1 | 90.8 | 90.8 | | 90.8 | |
| Minutes for olefin addition | 240 | 120 | 120 | 50 | 20 | 50 | 4 | 20 |
| Minutes of additional stirring | 255 | 35 | 35 | 55 | 25 | 55 | 8 | 24 |
| Product Analysis, H'C-Area Percent: | | | | | | | | |
| Isobutylene | 0.3 | 0.1 | 0.1 | 0.1 | 0.1 | 0.1 | 0.1 | 0.1 |
| Diisobutylene | 0.2 | 0.2 | 0.1 | 0.1 | <0.1 | 0.1 | <0.1 | 0.1 |
| Ethylbenzene | 0.6 | 1.3 | 1.2 | 0.3 | 0.5 | 0.3 | 0.8 | 0.5 |
| M- and p-xylene | 49.7 | 58.9 | 57.0 | 45.0 | 51.7 | 43.5 | 54.6 | 50.7 |
| o-Xylene | 0.2 | 0.5 | 0.4 | <0.1 | 0.1 | 0.1 | 0.2 | 0.1 |
| Triisobutylene | 3.4 | 3.8 | 2.2 | 1.1 | 0.7 | 0.7 | 0.8 | 0.4 |
| 5-t-butyl-m-xylene | 27.0 | 18.3 | 27.8 | 41.0 | 36.4 | 42.7 | 33.2 | 37.2 |
| m- and p-t-Butyl ethyl benzene | 3.9 | 2.9 | 3.1 | 4.2 | 3.6 | 3.7 | 3.3 | 3.6 |
| 4-t-butyl-o-xylene | 3.2 | 2.9 | 2.8 | 3.4 | 3.1 | 3.1 | 3.0 | 3.1 |
| 2-t-butyl-p-xylene | 0.8 | 0.6 | 0.6 | 0.6 | 0.4 | 0.6 | 0.4 | 0.4 |
| 4-t-butyl-m-xylene | 9.1 | 8.9 | 4.2 | 2.6 | 2.1 | 2.9 | 2.1 | 2.1 |
| $C_{16}$ | 0.7 | 0.5 | 0.3 | 1.0 | 0.8 | 1.3 | 1.1 | 1.2 |
| Heavier Material | 0.9 | 1.0 | 0.2 | 0.6 | 0.6 | 1.0 | 0.5 | 0.5 |
| Total | 100.1 | 100.0 | 100.0 | 100.1 | 100.1 | 100.1 | 100.1 | 100.0 |
| Percent Conversion—$C_4$= | 98.4 | 99.5 | 99.5 | 99.4 | 99.4 | 99.5 | 99.4 | 99.5 |
| Percent Conversion—Arom | 38.1 | 24.7 | 28.6 | 44.7 | 37.4 | 45.8 | 33.3 | 36.1 |
| Percent Conversion—m-x | 39.5 | 24.8 | 29.3 | 47.9 | 39.6 | 49.7 | 35.1 | 38.0 |
| Percent Sel. $iC_4$=to t-butylation | 80.3 | 60.5 | 73.7 | 100.6 | 97.2 | 98.6 | 88.6 | 82.5 |
| Percent Sel. $iC_4$=to 5-t-Bu-m-x | 49.3 | 33.0 | 53.2 | 79.6 | 77.6 | 79.4 | 70.0 | 66.1 |
| Percent Sel. $iC_4$=to 4-t-Bu-m-x | 16.6 | 16.0 | 8.0 | 5.0 | 4.5 | 5.4 | 4.4 | 3.7 |
| Isomer Distribution, Mole Percent: | | | | | | | | |
| 5-t-Bu-m-x | 74.0 | 67.2 | 86.9 | 94.0 | 94.5 | 93.6 | 94.1 | 94.3 |
| 4-t-Bu-m-x | 26.0 | 32.8 | 13.1 | 6.0 | 5.5 | 6.4 | 5.9 | 5.7 |

up to about 1.1 volumes of hydrocarbon per volume of sulfuric acid.

2. The method of claim 1 wherein the feedstock consists essentially of meta-xylene and isobutylene in alkylation proportions.

3. The method of claim 2 in which the feedstock contains ethylbenzene in an amount of about 0.2 to 10%.

4. The method of claim 3 in which the temperature is about —5 to 25° C.

5. The method of claim 2 in which the reaction mixture contains about 0.5 to 0.9 volume of hydrocarbon per volume of $H_2SO_4$ and the volume hourly space velocity is about 2 to 10.

6. A method for the production of 5-t-butyl-m-xylene which consists essentially of contacting in a continuous sulfuric acid phase, having a concentration of about 88 to 92 percent, at a temperature of about —10 to 30° C., a hydrocarbon feedstock consisting essentially of 4-t-butyl-m-xylene, in a ratio of up to about 1.1 volumes of hydrocarbon per volume of sulfuric acid.

7. The method of claim 6 in which the temperature is about —5 to 25° C.

8. The method of claim 6 in which the reaction mixture contains about 0.5 to 0.9 volume of hydrocarbon per volume of sulfuric acid and the volume hourly space velocity is about 2 to 10.

References Cited by the Examiner

UNITED STATES PATENTS

| | | | |
|---|---|---|---|
| 2,756,264 | 7/1956 | McCauly et al. ---- | 260—668 X |
| 2,801,271 | 7/1957 | Schlatter -------- | 260—671 X |
| 2,803,682 | 8/1957 | McCauly et al. ------ | 260—671 |
| 2,816,940 | 12/1957 | Schlatter --------- | 260—671 X |

DELBERT E. GANTZ, *Primary Examiner.*

C. R. DAVIS, *Assistant Examiner.*